US012812074B2

(12) United States Patent
Maier et al.

(10) Patent No.: US 12,812,074 B2
(45) Date of Patent: Nov. 24, 2026

(54) DISPLAY APPARATUS AND METHOD FOR DISPLAYING PIXELS OF AN IMAGE

(71) Applicant: TriLite Technologies GmbH, Vienna (AT)

(72) Inventors: Franz Josef Maier, Poertschach am Woerthersee (AT); Adarsh Shankar Prasad, Vienna (AT); Gerhard Schmid, Waldkirchen (AT); Faraj Nassar, Vienna (AT); Manuel Dorfmeister, Wiesen (AT); Joerg Reitterer, Brunn am Gebirge (AT)

(73) Assignee: TriLite Technologies GmbH, Vienna (AT)

( * ) Notice: Subject to any disclaimer, the term of this patent is extended or adjusted under 35 U.S.C. 154(b) by 242 days.

(21) Appl. No.: 18/749,837

(22) Filed: Jun. 21, 2024

(65) Prior Publication Data

US 2024/0428713 A1 Dec. 26, 2024

(30) Foreign Application Priority Data

Jun. 22, 2023 (EP) .................................... 23180876
Jun. 22, 2023 (EP) .................................... 23180877
(Continued)

(51) Int. Cl.
*H04N 9/31* (2006.01)
*G09G 3/02* (2006.01)

(52) U.S. Cl.
CPC ........... *H04N 9/3135* (2013.01); *G09G 3/025* (2013.01); *H04N 9/3182* (2013.01); *G09G 2360/122* (2013.01); *G09G 2360/16* (2013.01)

(58) Field of Classification Search
None
See application file for complete search history.

(56) References Cited

U.S. PATENT DOCUMENTS 5,715,021 A 2/1998 Gibeau et al.
5,774,174 A 6/1998 Hardie
(Continued)

FOREIGN PATENT DOCUMENTS

CN 109752839 A * 5/2019 .......... H04N 9/3135
GB 2457155 A 8/2009
(Continued)

OTHER PUBLICATIONS

Final Office Action received for U.S. Appl. No. 18/749,742, mailed on Aug. 14, 2025, 40 pages.
(Continued)

*Primary Examiner* — James M Anderson, II
(74) *Attorney, Agent, or Firm* — Weaver IP L.L.C.

(57) ABSTRACT

A display apparatus comprises a light source configured to emit a light beam, a pulse generator configured to generate a pulse train, a buffer configured to store pixels of an image, a controller configured to modulate the pulse train according to the pixels and to drive the light source according to the modulated pulse train, a mirror assembly configured to oscillate and scan the light beam over an image area according to a scan pattern, and a mirror driver configured to drive the mirror assembly, the pulse generator being configured to receive a brightness signal and to generate the pulse train with a low/high pulse rate when the brightness signal indicates a low/high brightness. A method displays pixels of an image with a low/high pulse rate at a low/high brightness.

17 Claims, 7 Drawing Sheets

(30) Foreign Application Priority Data

Figure 1:
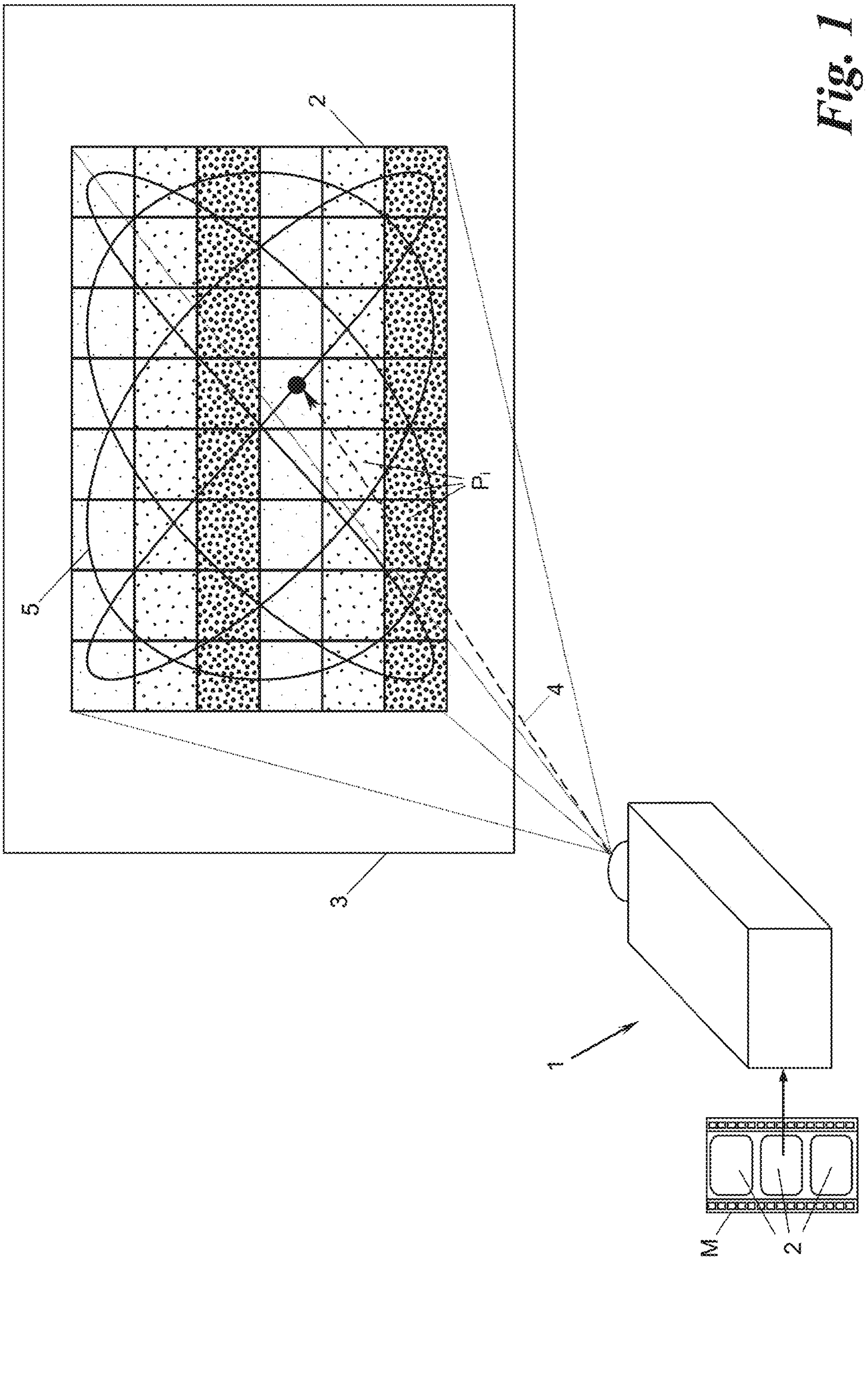

| | | |
|---|---|---|
| Sep. 8, 2023 | (EP) | 23196195 |
| Dec. 6, 2023 | (EP) | 23214645 |

(56) References Cited

U.S. PATENT DOCUMENTS

| | | | | |
|---|---|---|---|---|
| 6,373,495 | B1 | 4/2002 | Lin et al. | |
| 7,289,169 | B2 | 10/2007 | Suk | |
| 8,783,874 | B1 | 7/2014 | Riza | |
| 8,933,915 | B2 | 1/2015 | Peng et al. | |
| 10,043,490 | B2 | 8/2018 | Morein | |
| 10,288,990 | B1 | 5/2019 | Ratti et al. | |
| 10,313,645 | B1 * | 6/2019 | Held | G02B 27/0172 |
| 12,452,439 | B2 | 10/2025 | Maier et al. | |
| 2008/0136742 | A1 | 6/2008 | Tegreene et al. | |
| 2009/0051828 | A1 | 2/2009 | Brown et al. | |
| 2010/0208148 | A1 | 8/2010 | Deppe | |
| 2012/0127184 | A1 | 5/2012 | Satoh et al. | |
| 2012/0275697 | A1 | 11/2012 | McDowell et al. | |
| 2014/0126590 | A1 | 5/2014 | Kimura | |
| 2016/0044290 | A1 | 2/2016 | Morimoto | |
| 2018/0227540 | A1 | 8/2018 | Stolitzka | |
| 2018/0308458 | A1 | 10/2018 | Hall | |
| 2020/0184868 | A1 * | 6/2020 | Shen | G02B 26/10 |
| 2021/0210031 | A1 | 7/2021 | Kang | |
| 2022/0326594 | A1 | 10/2022 | Smits | |
| 2023/0370574 | A1 | 11/2023 | Blicharski et al. | |
| 2024/0428712 | A1 | 12/2024 | Maier et al. | |
| 2024/0430390 | A1 | 12/2024 | Maier et al. | |
| 2024/0430456 | A1 | 12/2024 | Maier et al. | |

FOREIGN PATENT DOCUMENTS

| | | |
|---|---|---|
| WO | 2019/143525 A1 | 7/2019 |
| WO | 2022/100847 A1 | 5/2022 |

OTHER PUBLICATIONS

Extended European Search Report received for European Patent Application No. 23180876.7, mailed on Dec. 11, 2023, 14 pages.

Extended European Search Report received for European Patent Application No. 23180877.5, mailed on Dec. 7, 2023, 9 pages.

Extended European Search Report received for European Patent Application No. 23196195.4, mailed on Mar. 11, 2024, 8 pages.

Extended European Search Report received for European Patent Application No. 23214645.6, mailed on May 22, 2024, 11 pages.

Doutre, et al., “An Efficient Compression Scheme for Colour Filter Array Video Sequences”, 2006, pp. 166-169.

“Non-Final Office Action received for U.S. Appl. No. 18/750,182, mailed on Jul. 16, 2025”, 13 pages.

“Notice of Allowance received for U.S. Appl. No. 18/749,745, mailed on Jun. 30, 2025”, 27 pages.

* cited by examiner

DISPLAY APPARATUS AND METHOD FOR DISPLAYING PIXELS OF AN IMAGE

CROSS-REFERENCE TO RELATED APPLICATIONS

This application claims priority to European Patent Application No. 23 180 876.7 filed Jun. 22, 2023, European Patent Application No. 23 180 877.5 filed Jun. 22, 2023, European Patent Application No. 23 196 195.4 filed Sep. 8, 2023, and European Patent Application No. 23 214 645.6 filed Dec. 6, 2023, the disclosures of which are incorporated herein by reference.

TECHNICAL FIELD

The present disclosed subject matter relates to a display apparatus comprising a light source configured to emit a light beam, a pulse generator configured to generate a pulse train having a pulse rate, a buffer configured to store pixels of an image, a controller configured to receive the pulse train and the stored pixels, to modulate the pulse train in pulse amplitude and/or pulse width according to the pixels, and to drive the light source according to the modulated pulse train, a mirror assembly with one or more mirrors configured to oscillate and scan the light beam over an image area according to a scan pattern, and a mirror driver configured to drive the mirror assembly according to said scan pattern. The present disclosed subject matter further relates to a method for displaying pixels of an image.

BACKGROUND

Display apparatus are commonly used in virtual reality (VR) or augmented reality (AR) glasses, helmets or head-up displays (HUDs) for a broad range of applications like navigation, training, entertainment, education or work. A pulse generator provides a pulse train to a controller that modulates the pulse train in amplitude and/or width according to pixels of an image (frame) that are stored in a buffer and successively fed to or retrieved by the controller. According to the modulated pulse train, the controller drives a light source to emit a mono- or multicoloured light beam which carries the image onto a mirror assembly having one or more moving micro-electro-mechanical-system (MEMS) mirrors driven by a mirror driver. The mirror assembly has, e.g., one MEMS mirror oscillating about two axes or two MEMS mirrors each oscillating about a respective axis, to deflect the light beam into subsequent directions (angles) towards an image area, one direction (angle) per pixel of the image to scan the light beam over the image area in order to display the pixels. In VR applications, the image area is typically a (miniature) reflective screen in front of the user's eye. In AR applications the image area is a semi-transparent combiner which redirects the visible light beam towards the user's eye while concurrently superposing it with a light field from a surrounding. In head mounted displays the mirror assembly may even deflect the scanned visible light beam directly into the user's eye, without any reflective screen or semi-transparent combiner.

To adapt the display apparatus to variable ambient lighting conditions or users' preferences, the brightness of the light beam can be adjusted, e.g., in dependence on a brightness signal measured by an ambient light sensor or provided by user input. Typically, the amplitude of the pulse train is scaled to set the brightness of the display.

However, scaling an electric current for driving the light source to set the brightness level of the display may reach two limits when going to low brightness levels. Firstly, the electric current resolution may not suffice to represent all different colour values at some point. Assuming, e.g., an electric current resolution of 10 μA of current laser drivers, downscaling the maximum pulse amplitude to 2 mA would not allow to represent 256 different colour values, as these would require a maximum pulse amplitude of $256 \cdot 10$ μA=2.56 mA, but only about 200 colour values ($200 \cdot 10$ μA=2 mA). Reducing display brightness may thus decrease colour depth, impairing image quality. Secondly, driving a laser light source at a low electric current may push it below a threshold for lasing, where stimulated emission is inhibited, resulting in a lower lasing efficiency, light beam and image quality.

BRIEF SUMMARY

It is an object of the present disclosed subject matter to provide a display apparatus and a method which allow for displaying an image with a high quality even at low brightnesses.

In a first aspect of the disclosed subject matter this object is achieved with a display apparatus as specified at the outset, wherein the pulse generator is configured to receive a brightness signal and to generate the pulse train with a low pulse rate when the brightness signal indicates a low brightness and with a high pulse rate when the brightness signal indicates a high brightness.

The disclosed subject matter breaks with the paradigm of adjusting the display brightness via an amplitude scaling of the pulse train and utilises the pulse rate of the pulse train for brightness adjustment. To this end, the pulse generator receives, e.g., from an ambient light sensor or a user-operated brightness control, the brightness signal indicating the desired brightness and switches the pulse rate between a low pulse rate for a low indicated brightness and a high pulse rate for a high indicated brightness and, optionally, one or more further intermediate pulse rates for intermediate brightness/es.

Utilising the pulse rate for brightness adjustment has several advantages. As the maximum amplitudes of the pulses need not be altered for brightness control the full amplitude range can be used for the desired grayscale or colour space. Even at low brightness a high quality image can be obtained. Moreover, decreasing the pulse rate for low brightness also decreases the rate of retrieving the pixels from the buffer and any image memory upstream of the buffer, reducing buffer, controller and processing loads. Furthermore, the present display apparatus saves energy at low brightness levels not only by emitting less light, but also by reducing necessary processing power. Finally, an electric current for laser driving can be maintained above the lasing threshold, preserving lasing efficiency, light beam quality and hence image quality.

The scan pattern may be a non-raster scan pattern, e.g., a spiral pattern, or even a raster scan pattern. In a beneficial embodiment the scan pattern is a Lissajous pattern, which allows to exploit resonances of the mirrors of the mirror assembly and, hence, to achieve higher speeds of the light beam and higher frame rates with low driving powers.

The synchronisation of the pixel retrieval with the mirror assembly position may be established in many ways. The disclosed subject matter provides for at least two advantageous embodiments.

In a first advantageous embodiment the controller or the buffer is configured to receive a current position of the mirror assembly within the scan pattern from the mirror driver and to retrieve that stored pixel that corresponds to the current position from the buffer for modulating. Thereby, the mirror driver provides the current mirror position within the scan pattern, e.g., within the Lissajous pattern, to the controller or buffer which then identifies the currently needed pixel for the indicated mirror position and retrieves that pixel for modulating. This setup ensures that the pixel used by the controller matches the current MEMS mirror position irrespective of the current pulse rate. Moreover, decreasing the pulse rate for low brightnesses allows the mirror assembly to provide the current position less often while still achieving a tight synchronisation of the pixel retrieval with the mirror assembly position.

In a second advantageous embodiment the display apparatus further comprises a processor configured to hold the image in a memory, to determine a sequence of pixels of the image to be successively displayed according to said scan pattern, and to transfer said sequence of pixels in one or more successive segments to the buffer for storing. Thereby, time-critical real-time components like the mirror driver, the controller and the buffer that need to be exactly synchronised to one another are separated from the processor that may only be loosely synchronised to the real-time components. The processor thus has valuable headroom or "slack" for the task of determining the playout-order of the pixels and transferring the pixels in that order to the buffer. The buffer receives the pixels from the processor already in the correct order, i.e. as they are to be played out according to the scan pattern. The buffer pixels can, thus, be retrieved with a fast sequential contiguous ("linear") buffer access and quickly. Furthermore, as the buffer stores the pixels in the correct order the pixel retrieval need not be synchronised each time a new pixel is to be played-out but, e.g., only when the play-out of several pixels (a "batch" of pixels) shall be (re-)synchronised to the mirror assembly position. Hence, the mirror assembly may send an optional synchronisation or trigger signal less often, obviating the need for a frequent processing of synchronisation signals and identifying scattered memory addresses when retrieving the pixels from the buffer. The pixels can be retrieved at a higher rate, and the display apparatus is capable to display images with a higher resolution and/or frame rate.

The loose synchronisation of the processor to the real-time components may be established in many ways. For instance, the processor may be synchronised by the mirror driver when the mirror assembly is in a given position, by the buffer when its filling level falls below a predetermined threshold, etc. Optionally, the transferring of said segment/s is triggered by each l-th pulse of the pulse train. In this way, the pulse generator serves as a "system clock" triggering both the pixel transfer (every l-th pulse) and retrieval (every pulse) and, thus, synchronising the time-critical components to the processor. Thereby, decreasing the pulse rate for low brightness automatically results in lowering the retrieval and transferring rate and, due to the latter, in more time available for the processor to determine the sequence of pixels. Thus, at a low brightness, the processor, the pulse generator, the buffer and the controller are less busy and the display apparatus requires even less electric power.

In a further embodiment the processor is configured to determine the sequence of pixels in successive parts. In this way, the processor determines the pixels of the sequence of pixels at several instances of time, e.g., one part every k-th clock cycle of the processor or every l-th pulse of the pulse train. Hence, between each two of those instances the processor may perform other tasks like adapting the pixels of the image to dynamically correct for geometrical distortions, e.g., due to a change in image area geometry. To this end, each part optionally comprises at least one segment such that pixels of a determined part may be promptly transferred to the buffer, e.g., within the same or the next processor clock cycle of its determination.

The processor may determine the sequence of pixels based on an on-the-fly calculation of the scan pattern. For a particularly fast determination the processor is optionally configured to store a look-up table of indices of the pixels to be successively displayed according to said scan pattern and to determine the sequence of pixels by retrieving the pixels according to the look-up table from the memory. The processor can easily and quickly determine the sequence of pixels by accessing the look-up-table to obtain the indices of the pixels and then the memory to retrieve the pixels according to the indices.

In a favourable embodiment the high pulse rate is at least twice of the inverse of the shortest duration of stay of the light beam in one pixel of said image when scanning the light beam according to the scan pattern. Employing such a high pulse rate guarantees that each pixel of the image, including the pixel with the shortest duration of stay of the light beam, is displayed by at least two successive pulses. This creates the necessary headroom that at low pulse rates each pixel of the image may be displayed by at least one pulse, preserving image resolution at low brightnesses.

On the other hand, the low pulse rate may be less than the inverse of the shortest duration of stay of the light beam in one pixel of said image when scanning the light beam according to the scan pattern, leading to intentionally left out pixels ("holes") within one run of the scan pattern. This allows for particularly low brightnesses and a particularly low power consumption, albeit at the cost of image resolution.

Image resolution can, however, be preserved when the pixels are interlaced over successive runs of the scan pattern. To this end, in an optional variant of this embodiment the low pulse rate is an m-th of the inverse of the duration of stay of the light beam in one pixel of said image when scanning the light beam according to the scan pattern, and m successive sections of the pulse train each containing pulses of a respective scan of the scan pattern are mutually offset in time with respect to the beginning of the respective scan of the scan pattern by an integer multiple n of an m-th of the inverse of the low pulse rate, n modulo m being unequal to zero. In this variant, every m-th pixel traversed by the light beam is displayed within each scan ("run") of the scan pattern, and the mutual time offset of the m sections guarantees that each scan and section displays different pixels. The pixels of different scans of the scan pattern are then interlaced and the image is completed at full resolution after m runs of the scan pattern, all that with a particularly low brightness and full greyscale or colour space. Of course, when the duration of stay of the light beam in one pixel varies within one run of the scan pattern, i.e., when the light beam spends a different amount of time in different pixels, the low pulse rate may vary accordingly to achieve the m-fold interlacing.

This variant may advantageously be combined with the above-mentioned processor when the latter is further configured to transfer at least one segment per scan of the scan pattern. Each segment may then comprise, e.g., all, a half, a third, etc. of the pixels for the modulation of the current or following section of the pulse train. The buffer may store only the pixels of one, two, three, etc. small segments and, hence, be particularly small and fast accessible. Optionally, the processor may also determine the sequence section-wise such that each of the above-mentioned parts corresponds to one section of the pulse train or a unit fraction thereof.

In some embodiments the image may be displayed by a mono-coloured light beam. For displaying a multi-coloured image in optional embodiments each pixel has two or more colours, e.g. the colours red, green and blue, the light source comprises for each of said colours a sub-light source configured to emit a respective sub-light beam of the respective colour, and the controller is configured to perform said modulating and driving separately for each of said colours.

In a second aspect the disclosed subject matter provides a method for displaying pixels of an image, comprising

- by means of a pulse generator, receiving a brightness signal and generating a pulse train with a low pulse rate when the brightness signal indicates a low brightness and with a high pulse rate when the brightness signal indicates a high brightness;
- storing said pixels in a buffer;
- receiving the stored pixels successively in a controller;
- by means of the controller, modulating the pulse train in pulse amplitude and/or pulse width according to the received pixels and driving a light source according to the modulated pulse train to emit a light beam;
- driving, by means of a mirror driver, a mirror assembly with one or more mirrors to oscillate according to a scan pattern; and
- scanning, by means of the mirror assembly, the light beam over an image area according to said scan pattern.

The method displays pixels of the image adjustably at a low or a high brightness by setting a low or high pulse rate, respectively. For further advantages and advantageous embodiments of the method, reference is made to the advantages and embodiments described above with respect to the display apparatus of the disclosed subject matter.

BRIEF DESCRIPTION OF THE DRAWINGS/FIGURES

Figure 2:
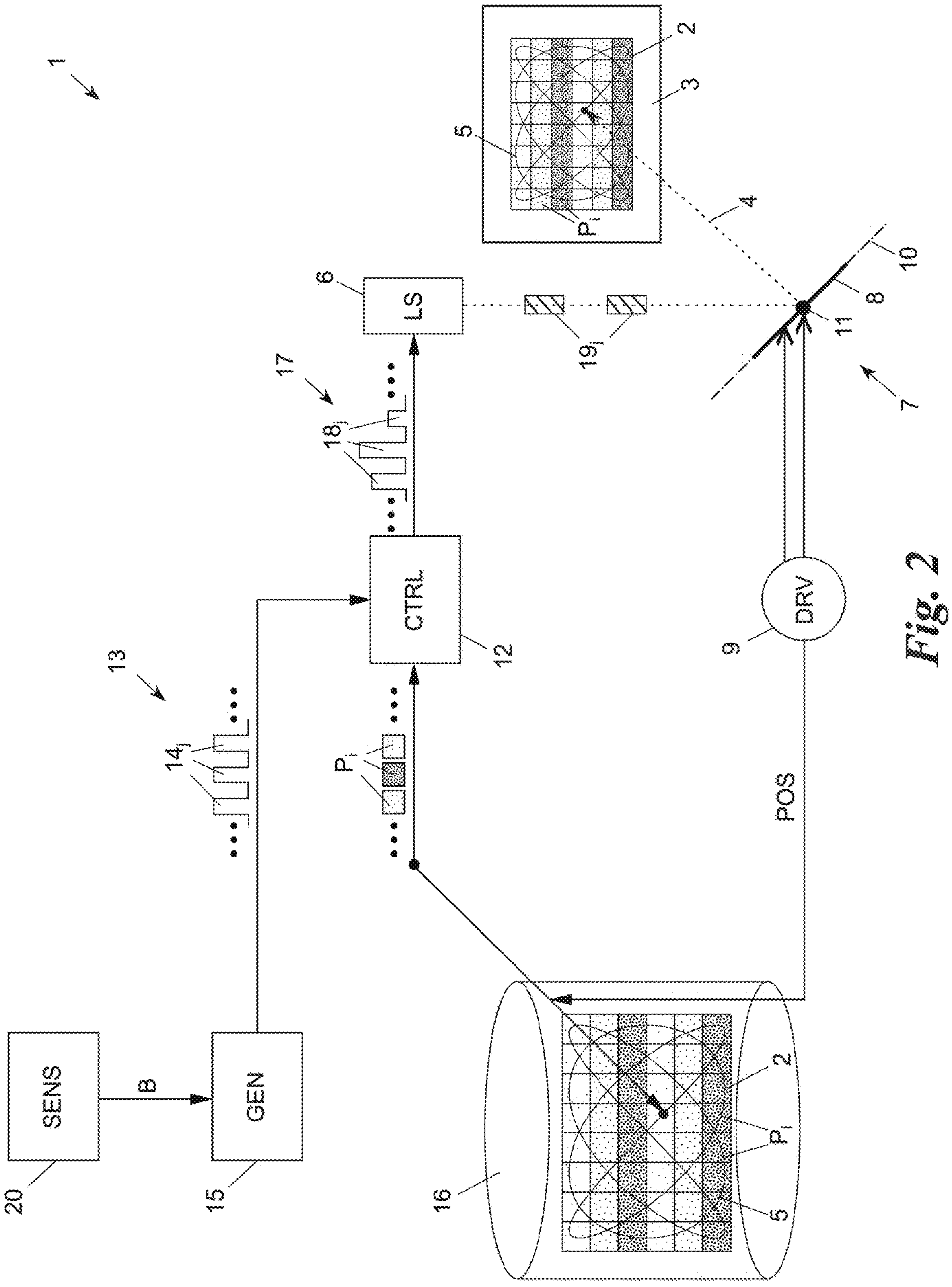
Figure 3A:
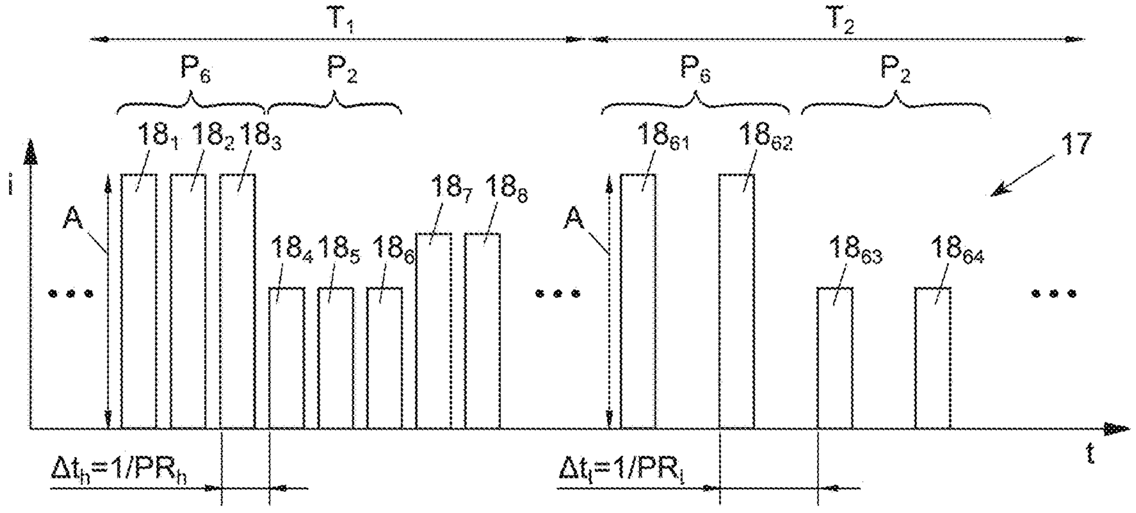
Figure 3B:
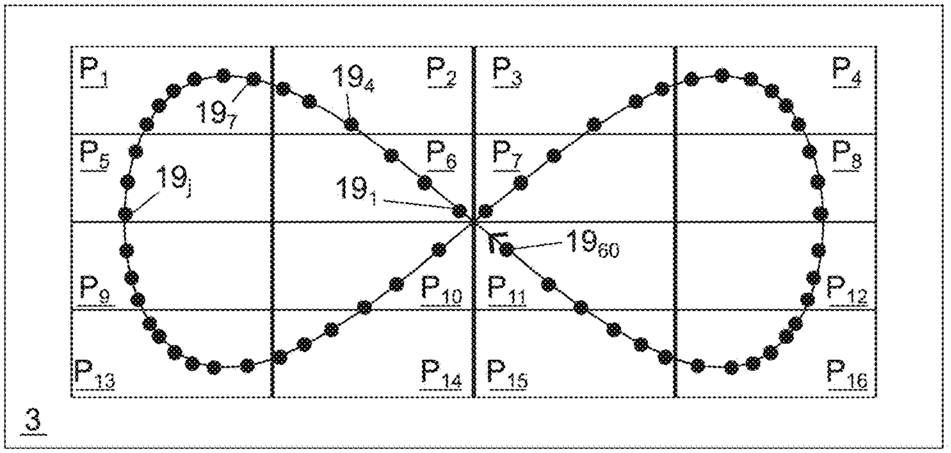
Figure 3C:
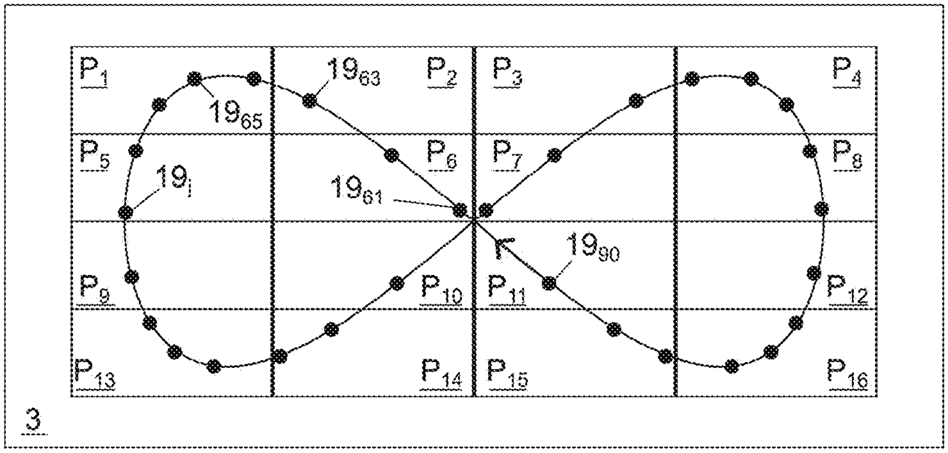
Figure 4:
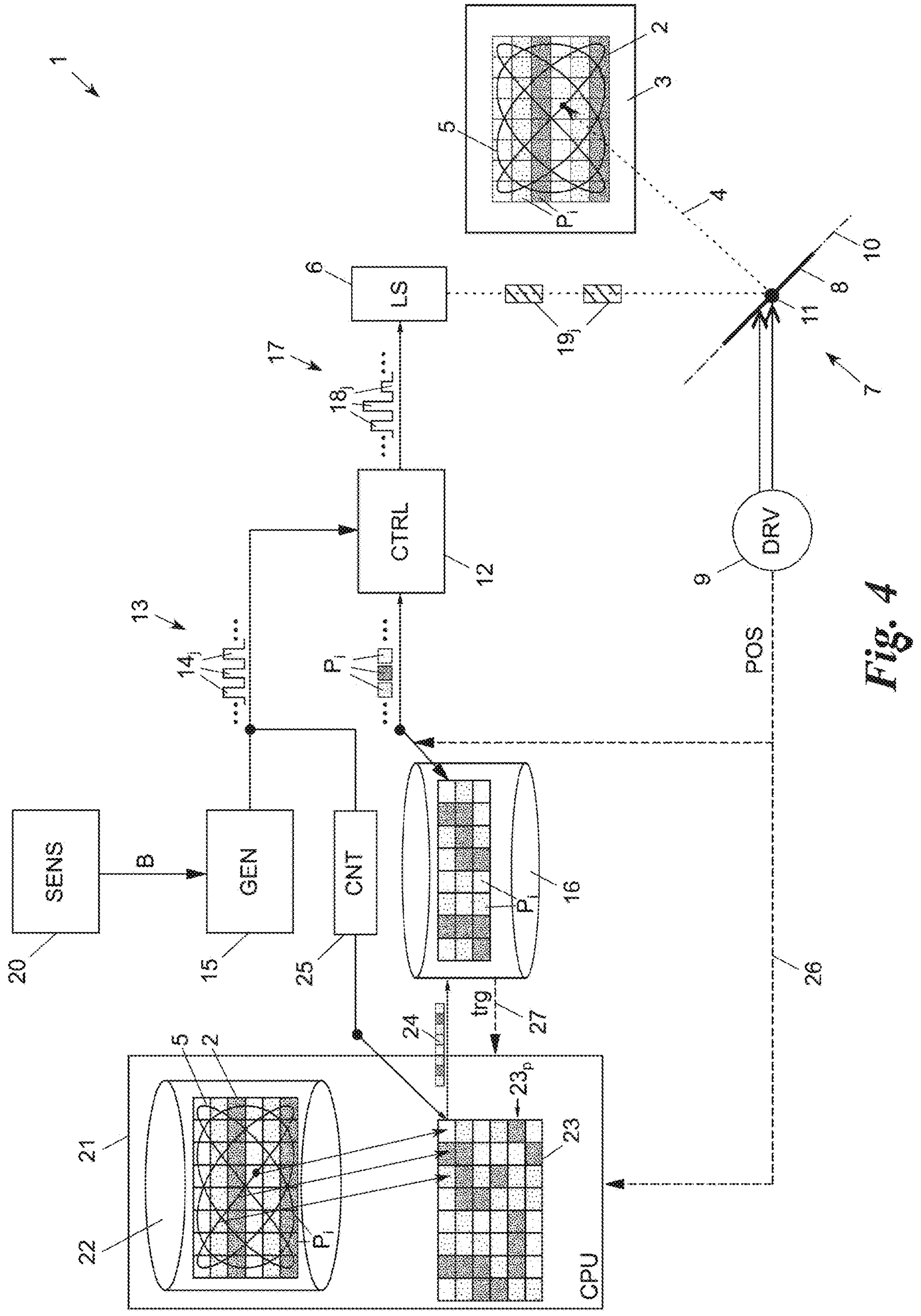
Figure 5A:
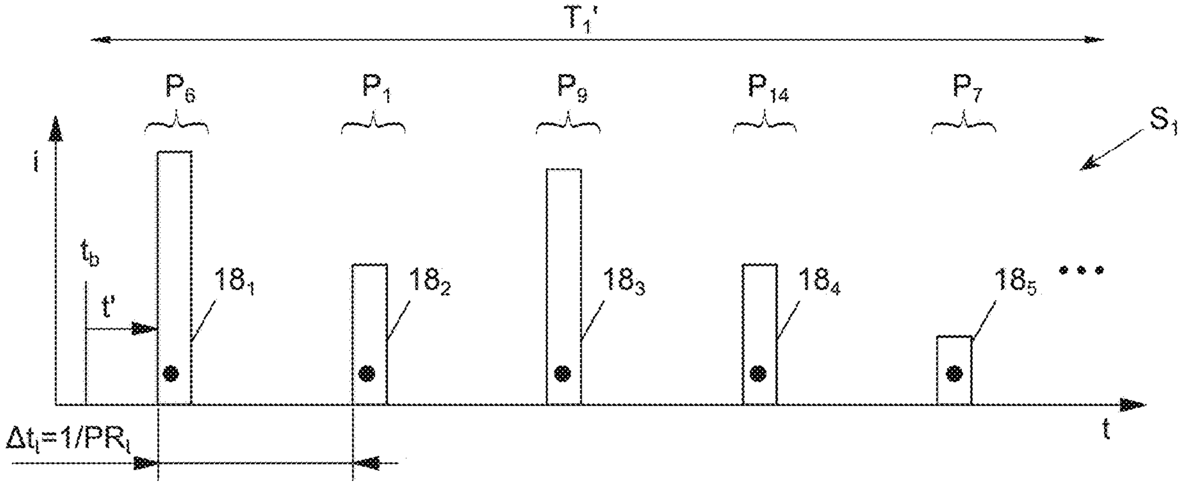
Figure 5B:
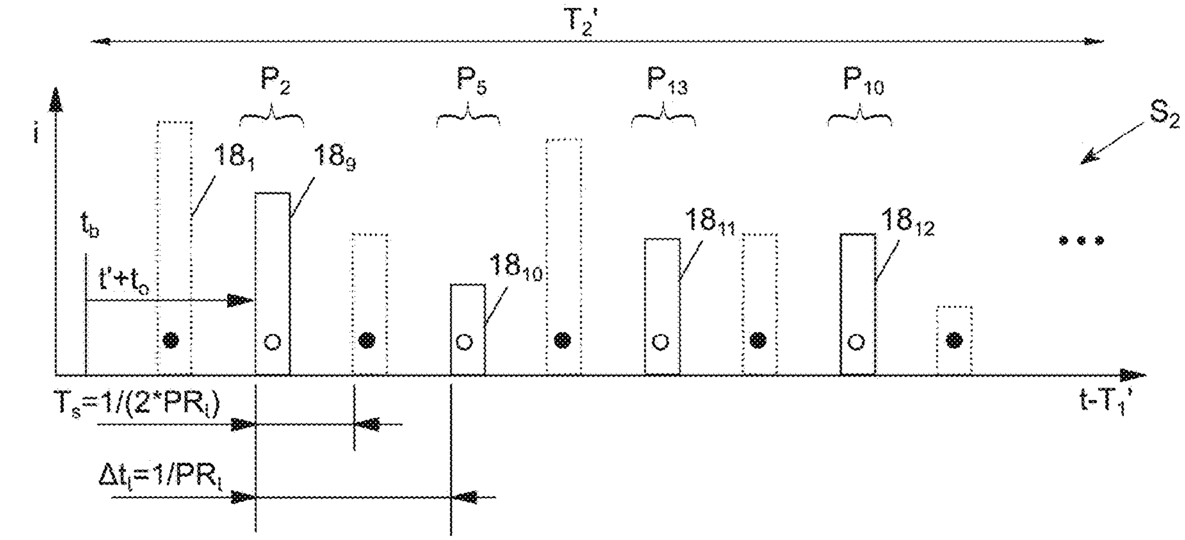
Figure 5C:
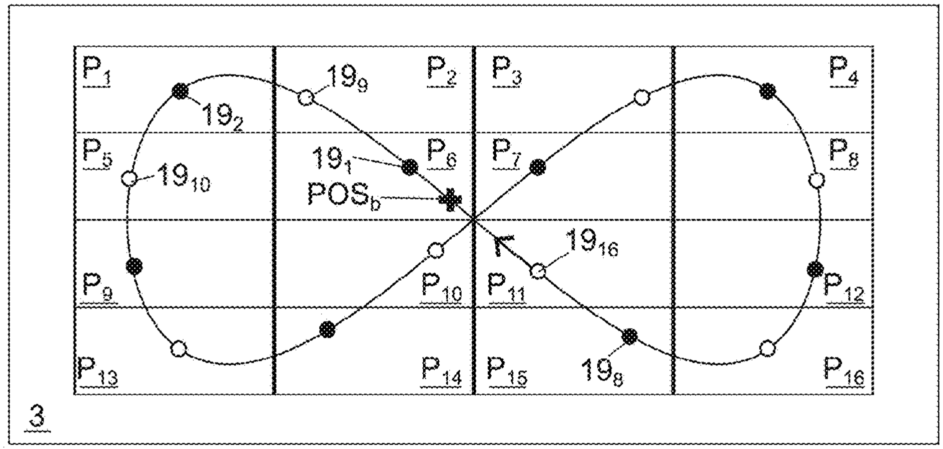
Figure 6:
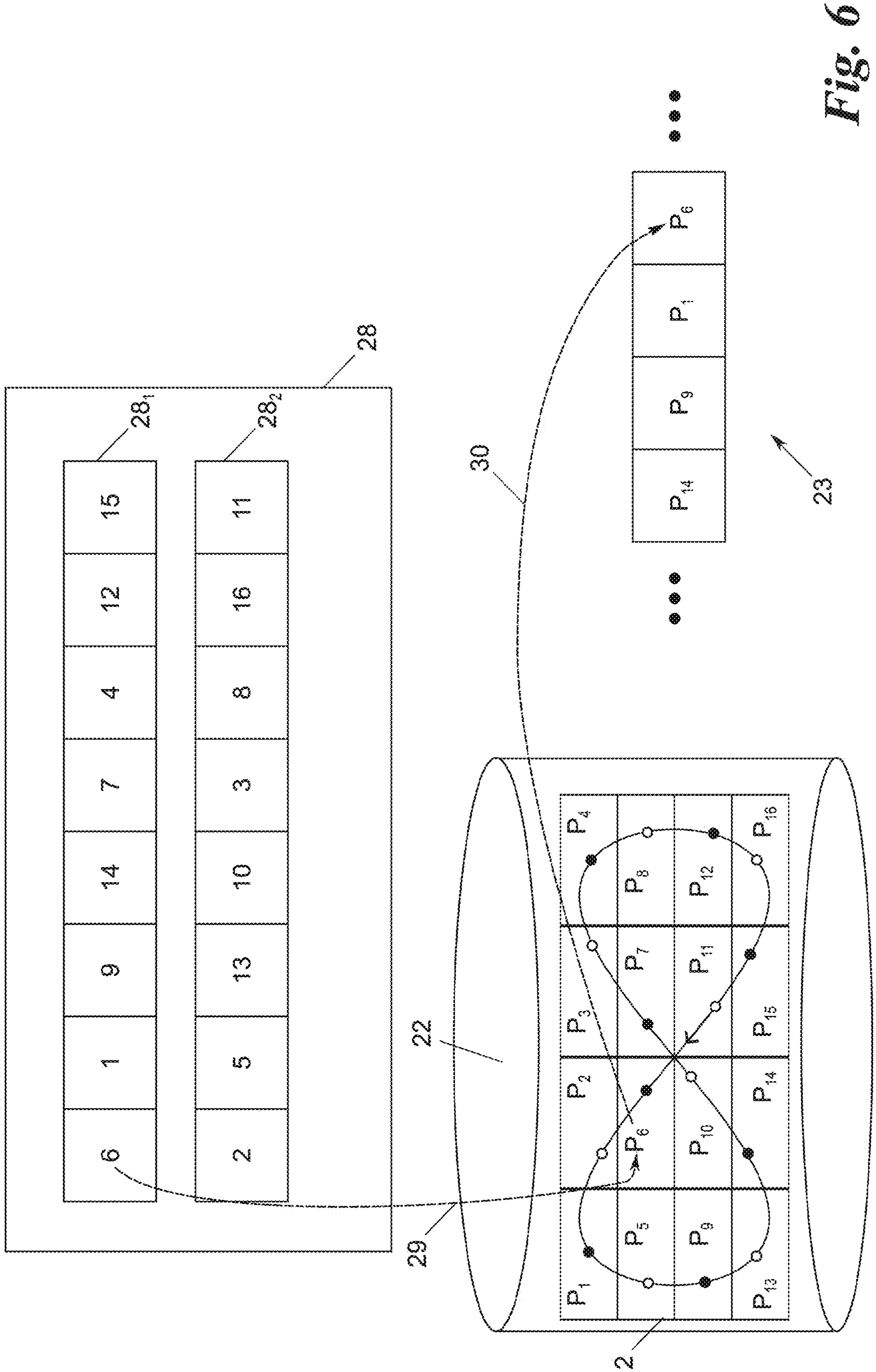
Figure 7:
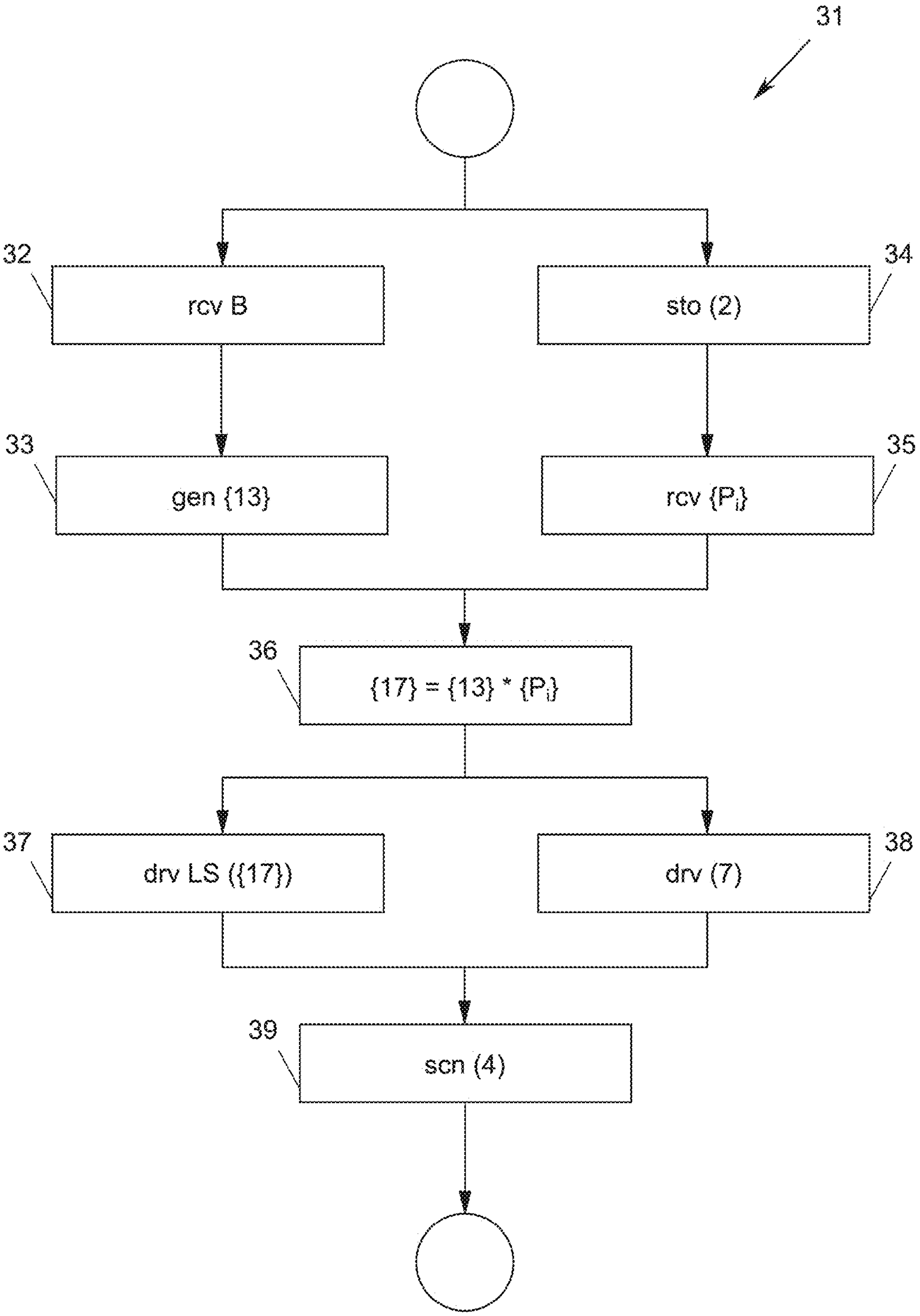

The disclosed subject matter will now be described by means of exemplary embodiments thereof with reference to the enclosed drawings, in which show:

FIG. 1 a display apparatus according to the disclosed subject matter in the process of displaying an image on an image area in a schematic perspective view;

FIG. 2 a first embodiment of the display apparatus of FIG. 1 in a schematic circuit diagram;

FIG. 3*a* an exemplary pulse train occurring in the display apparatus of FIGS. 1 and 2, having a high pulse rate within a first time interval and a low pulse rate within a second time interval, in a time diagram;

FIGS. 3*b* and 3*c* the light pulses resulting from the pulse train of FIG. 3*a* on the image area within the first time interval (FIG. 3*b*) and the second time interval (FIG. 3*c*);

FIG. 4 a second embodiment of the display apparatus of FIG. 1 in a schematic circuit diagram;

FIGS. 5*a* and 5*b* another example of a pulse train occurring in the display apparatus of FIGS. 1, 2 and 4 during a first scan of the scan pattern (FIG. 5*a*) and a subsequent second scan of the scan pattern (FIG. 5*b*) in respective time diagrams;

FIG. 5*c* the light pulses resulting from the pulse train of FIGS. 5*a* and 5*b* on the image area;

FIG. 6 an exemplary determination of a sequence of pixels used for modulating the pulse train of FIGS. 5*a* and 5*b* in a schematic diagram; and FIG. 7 a method according to the disclosed subject matter that is carried out by the display apparatus of FIGS. 1, 2 and 4 in a flow diagram.

DETAILED DESCRIPTION

FIG. 1 shows a display apparatus 1 displaying an image 2 onto a wall 3 by scanning the wall 3 with a pulsed light beam 4 according to a scan pattern, here: a Lissajous pattern 5, to draw, one after the other, pixels $P_i$ of the image 2. The image 2 may have a pixel resolution according to a conventional image or video standard, e.g., full HD (1920×1080 pixels), UHD (3840×2160 pixels), 4K (4096×2160 pixels) etc., and the scan pattern may densely cover the pixels $P_i$; however, for illustrational purposes an image 2 with only few pixels $P_i$ and a simple, coarse Lissajous pattern 5 have been shown in FIG. 1. Instead of the Lissajous pattern 5 shown, the scan pattern may be any other non-raster scan pattern, e.g., a spiral pattern, or even a raster scan pattern.

The image 2 may be part of a movie M, be a single image, e.g., a photo to be displayed for a longer period of time, part of a larger image, etc. Instead of a wall 3, the display apparatus 1 could display the light beam 4 onto any kind of image area, such as a board, projection screen, poster, the retina of an eye, an augmented reality (AR) combiner waveguide, another combiner optics, or the like. Accordingly, the display apparatus 1 may be part of a projector, AR or VR (virtual reality) glasses, a helmet, a head-up display, etc.

With reference to FIGS. 1 and 2, the display apparatus 1 has a light source 6 emitting the light beam 4 and a mirror assembly 7 with one or more (here: one) micro-electro-mechanical-system, MEMS, mirrors 8 for deflecting the emitted light beam 4 towards the wall 3. The MEMS mirror 8 is driven by a mirror driver 9 to oscillate about a horizontal axis 10 with a horizontal oscillation period $T_h$ and about a vertical axis 11 with a vertical oscillation period $T_v$, in order to deflect the emitted light beam 4 towards the wall 3 according to said Lissajous pattern 5. As the oscillation of the MEMS mirror 8 determines the deflection pattern, i.e. the Lissajous pattern 5, both the oscillation and the deflection are carried out according to one and the same Lissajous pattern 5.

The mirror assembly 7 may either comprise one MEMS mirror 8 oscillating about the horizontal and vertical axes 10, 11 or two MEMS mirrors 8, one after the other in the optical path of the light beam 4, each of which MEMS mirrors 8 then oscillating about one of the horizontal and vertical axes 10, 11.

Depending on the Lissajous pattern 5 to be displayed, $T_h$ and $T_v$ may be chosen such that the trajectory of the light beam 4 on the image plane 2 densely covers the entire image plane 2 during a period $T_{fr}$ of one image frame 2. Such a "complex" or "dense" Lissajous pattern 5 can be achieved when the frequencies $f_h=1/T_h$, $f_v=1/T_v$ are greater than the frame rate $f_{fr}=1/T_{fr}$, e.g., greater than 1 kHz or tens of kHz, and the beginnings of their respective oscillation periods meet, e.g., only over every one or more images 2, in particular when the frequencies $f_h$, $f_v$ are close to each other. To this end, frequencies $f_h$, $f_v$ with a small greatest common divisor, e.g. smaller than 10, may be employed, for example.

The light source 6 may be any light source known in the art, e.g., an incandescent lamp, a gas, liquid or solid laser, a laser diode, a vertical-cavity surface-emitting laser (VC- SEL), an LED, an SLED, etc. The light source 6 is driven by a controller 12 according to the pixels $P_i$ of the image 2. To this end, the controller 12 receives, on the one hand, a train 13 of pulses $\mathbf{14}_j$ that is generated by a pulse generator 15 of the display apparatus 1, and, on the other hand, the pixels $P_i$ of the image 2 that are stored in a buffer 16 of the display apparatus 1. The controller 12 may receive the stored pixels $P_i$ either by retrieving the pixels $P_i$ itself from the buffer 16, e.g. when the controller 12 is part of the buffer 16, or by obtaining them from a buffer controller, e.g. when the controller 12 is separate from the buffer 16. The pixel retrieving is synchronised with the pulses $\mathbf{14}_j$ of the pulse train 13.

To synchronise the pixel retrieving with the mirror movement, in the embodiment of FIG. 2 the mirror driver 9 provides once or repetitively a current position POS of the mirror assembly 7 within the scan pattern 5 indicating the current pixel $P_i$ to be retrieved to the controller 12 or buffer controller. Alternatively, the pixels $P_i$ may already be stored in the buffer 16 in the correct play-out order as described below with reference to the embodiment of FIG. 4.

According to the received pixels $P_i$, i.e. according to the colour of each received pixel $P_i$, the controller 12 modulates the pulse train 13 in pulse amplitude A (FIGS. 2, 3*a*, 5*a* and 5*b*), in pulse width (not shown) or in both (not shown), to obtain a modulated train 17 of pulses $\mathbf{18}_j$. The controller 12 drives the light source 6 with the modulated train 17 to emit one light pulse $\mathbf{19}_j$ per electric pulse $\mathbf{18}_j$ of the modulated train 17. Hence, each light pulse $\mathbf{19}_j$ encodes one colour of one pixel $P_i$.

In case the light source 6 displays a mono-colour, black and white, or grey scale image 2 with a mono-coloured light beam 4, each pixel $P_i$ comprises a single colour, e.g., a brightness or intensity value, and the controller 12 drives the light source 6 according to one modulated train 17. In case the light source 6 displays a multi-colour image 2 with a multi-coloured light beam 4 having a sub-light beam emitted by a sub-light source for each colour, each pixel $P_i$ comprises several colours, e.g., RGB values indicating the brightness or intensity of a red, green, and blue colour, YPbPr values, etc., and the controller 12 drives each sub-light source according to a respective modulated train 17 (not shown).

The display apparatus 1 utilises the pulse rate PR, i.e. the inverse pulse time spacing Δt, also known as "pulse repetition rate" or "pulse frequency", employed by the pulse generator 15 when generating the pulse train 13 to adjust the brightness of the pixels $P_i$ displayed on the image area 3. The pulse rate PR may be uniform throughout one scan of the scan pattern 5, or varying locally to account for unequal mirror velocities within the scan pattern 5 and thus durations of stay of the light beam 4 in different pixels $P_i$ of the image 2. With reference to FIGS. 2 and 3*a*-3*c* such a brightness adjustment shall now be described.

As can be seen in FIG. 2 the pulse generator 15 receives a brightness signal B, e.g. from an ambient light sensor 20 or from a user-operated brightness control. Depending on the brightness indicated in the brightness signal B, the pulse generator 15 generates the pulse train 13 to have a low pulse rate $PR_l$ for a low indicated brightness or a high pulse rate $PR_h$ for a high indicated brightness.

In the example of FIGS. 3*a*-3*c* the pulse generator 15 receives a brightness signal B indicating a high brightness at the beginning of a first time interval $T_1$. Hence, the train 13 of pulses $\mathbf{14}_j$ is generated and the train 17 of pulses $\mathbf{18}_j$ is modulated to have a high pulse rate $PR_h$ (FIG. 3*a*: left time interval $T_1$). FIG. 3*b* depicts the pulses $\mathbf{19}_1$-$\mathbf{19}_{60}$ of the light beam 4 on the image area 3 resulting from the pulses $\mathbf{18}_1$-$\mathbf{18}_{60}$ of FIG. 3*a* with the high pulse rate $PR_h$ when the first time interval $T_1$ exemplarily lasts for one scan ("run") of the light beam 4 over the scan pattern 5, i.e. for one scan of the scan pattern 5. As can be seen, the density of the light pulses $\mathbf{19}_1$-$\mathbf{19}_{60}$ on the image area 3 is high such that the image 2 is displayed at the desired high brightness indicated in the brightness signal B.

After the first interval $T_1$ has lapsed in the example of FIGS. 3*a*-3*c* the pulse generator 15 receives a brightness signal B indicating a low brightness at the beginning of a second time interval $T_2$. Now, the train 13 of pulses $\mathbf{14}_j$ is generated and the train 17 of pulses $\mathbf{18}_j$ is modulated to have a low pulse rate $PR_l$. FIG. 3*c* depicts the pulses $\mathbf{19}_{61}$-$\mathbf{19}_{90}$ of the light beam 4 on the image area 3 resulting from the pulses $\mathbf{18}_{61}$-$\mathbf{18}_{90}$ of FIG. 3*a* with the low pulse rate $PR_l$ when the second time interval $T_2$ exemplarily also lasts for one scan of the scan pattern 5. As can be seen, the density of the light pulses $\mathbf{19}_{61}$-$\mathbf{19}_{90}$ is low such that the image 2 is displayed on the image area 3 at the desired low brightness indicated in the brightness signal B.

Comparing the amplitudes A, e.g., of the pulses $\mathbf{18}_1$ and $\mathbf{18}_{61}$ used for displaying pixel $P_6$, it is apparent that the amplitudes need not be reduced to achieve the low brightness (albeit they could, e.g. for further brightness reduction). Consequently, the full possible range of amplitudes A may be utilised to display pixel colours.

In the example of FIGS. 3*a*-3*c* the high pulse rate $PR_h$ is at least two times and the low pulse rate $PR_l$ at least one time of the inverse of the shortest duration of stay of the light beam 4 in the pixel with the shortest duration of stay among all pixels $P_i$ (here: the pixel $P_6$). Then all of the pixels $P_i$ are displayed by at least two light pulses $\mathbf{19}_j$ at the high pulse rate $PR_h$ (FIG. 3*b*), generating a "headroom" for displaying all of the pixels $P_i$ still by at least one light pulse $\mathbf{19}_j$ when a low pulse rate $PR_l$ (FIG. 3*c*) is applied.

Of course, other values of the high and/or low pulse rates $PR_h$, $PR_l$ may be chosen, e.g., as detailed below. Moreover, depending on the required brightness granularity the pulse generator 15 may generate the train 13 with one or more intermediate pulse rates $PR_i$ when the brightness signal B indicates a respective intermediate brightness.

FIG. 4 depicts a further embodiment of the display apparatus 1 which additionally comprises a processor 21 for supplying the buffer 16 with the pixels $P_i$ in the correct order, i.e. as they are to be displayed according to the scan pattern 5. The processor 21 holds the image 2 in a memory 22, e.g., an SRAM or DRAM memory, which may be part of the processor 21 or external therefrom, and transforms the image 2, whose pixels $P_i$ are not ordered according to the scan pattern 5, to a pixel sequence 23 whose pixels $P_i$ are ordered according to the scan pattern 5. The processor 21 transfers the pixel sequence 23 in one or more segments 24 to the buffer 16 for storing. Then the controller 12 or said buffer 16 retrieves—e.g. synchronised by the pulse train 13—the stored pixels $P_i$ successively for modulating. To this end, the buffer 16 may optionally be a first-in first-out (FIFO) buffer. Hence, in this embodiment the mirror driver 9 may provide the synchronisation signal POS not at all or less often to loosely synchronise the pixel retrieval to the mirror movement.

The processor 21 may determine the sequence 23 of pixels $P_i$ in any time granularity, e.g., for each image 2 at once or successively in subsequent parts $\mathbf{23}_1$, $\mathbf{23}_2$, . . . , generally $\mathbf{23}_p$. Each part $\mathbf{23}_p$ may comprise one or more segments 24. Moreover, the processor 21 may determine the sequence 23 in many ways, e.g., on-the-fly by matching positions that follow each other in time along the scan pattern 5 to pixels $P_i$ in the image 2 occurring at these positions, or by means of a look-up table as described below with reference to FIG. 6.

The transfer of the segment/s 24 may be triggered by each l-th pulse $\mathbf{14}_j$ of the pulse train 13, i.e. the pulse generator 15 may serve as a "system clock" triggering both the pixel retrieval, modulation and display as well as the pixel transfer from the processor 21 to the buffer 16. A pulse counter 25 may count 1 pulses $\mathbf{14}_j$ each and then trigger the transfer. The number 1 may, e.g., be the number of pixels $P_i$ of the image 2 or a half, a third, etc. of that number, to transfer one segment 24 per whole, half, third, etc. image ("frame") 2.

Alternatively, the segment transfer may be triggered by the mirror driver 9 (see broken arrow 26) to transfer segments 24 in synchronicity with the mirror position POS, e.g., every vertical or horizontal oscillation period $T_v$, $T_h$, or by the buffer 16 each time a filling level of the buffer 16 falls below a predetermined threshold (see arrow 27), or every k-th cycle of the clock of the processor 21, etc.

An interlacing of the pixels $P_i$ for achieving a particularly low brightness shall now be described with reference to FIGS. 5*a*-5*c*.

Here, the low pulse rate $PR_l$ is less than the inverse of the shortest duration of stay of the light beam 4 in one pixel $P_i$ of the image 2 when the light beam 4 is scanned across the image 2 according to the scan pattern 5 (here: the pixel $P_6$). Hence, the light pulses $\mathbf{19}_j$ within one scan (run) of the scan pattern 5 do not display each pixel $P_i$ but leave out pixels, i.e. leave "holes", see the pixels $P_i$ with an empty circle in the first scan or run of the scan pattern 5 in FIG. 5*c*.

In the embodiment shown in FIGS. 5*a*-5*c*, the low pulse rate $PR_l$ is half of the duration of stay $T_s$ of the light beam 4 in one pixel $P_i$ of the image 2, leading to the holes shown in FIG. 5*c*. As the duration of stay $T_s$ typically varies from pixel $P_i$ to pixel $P_i$ the low pulse rate $PR_l$ will vary accordingly for each "one pixel $P_i$". For the sake of simplicity, however, FIGS. 5*a* and 5*b* depict a scenario with a uniform duration of stay $T_s$.

In a first time interval $T_1$' of FIG. 5*a* corresponding to the first scan ("run") of the scan pattern 5 a first section $S_1$ of the pulse train 17 containing the pulses $\mathbf{18}_1$-$\mathbf{18}_8$ and the corresponding light pulses $\mathbf{19}_1$-$\mathbf{19}_8$ (shown as filled circles in FIGS. 5*a*-5*c*) are played out for displaying every second pixel $P_i$ along the scan pattern 5, here: a first pixel succession $P_6 \rightarrow P_1 \rightarrow P_9 \rightarrow P_{14} \rightarrow P_7 \rightarrow P_4 \rightarrow P_{12} \rightarrow P_{15}$.

To fill the holes (empty circles) by interlacing, in a second time interval $T_2$ of FIG. 5*b* corresponding to a second scan of the scan pattern 5 a second section $S_2$ of the pulse train 17 containing the pulses $\mathbf{18}_9$-$\mathbf{18}_{16}$ of the train 17 and the corresponding light pulses $\mathbf{19}_9$-$\mathbf{19}_{16}$ (shown as empty circles in FIGS. 5*b*-5*c*) are played out for displaying every other second pixel $P_i$ along the scan pattern 5, here: a second pixel succession $P_2 \rightarrow P_5 \rightarrow P_{13} \rightarrow P_{10} \rightarrow P_3 \rightarrow P_8 \rightarrow P_{16} \rightarrow P_{11}$.

The interlacing of the second pixel succession with the first pixel succession on the image area 3 is achieved by offsetting the pixel sections $S_1$, $S_2$ of the pulse train 17 with respect to the beginning $t_b$ of the respective first and second scans of the scan pattern 5, e.g., by offsetting the pulse train 13 by the pulse generator 15 and/or the modulated pulse train 17 by the controller 12 and/or the mirror movement by the mirror driver 9, etc. In the example of FIGS. 5*a*-5*c*, the beginning $t_b$ of each scan pattern 5 corresponds to a position $POS_b$ of the scan pattern 5 in pixel $P_6$ on the image area 3, the first section $S_1$ is offset from the beginning $t_b$ by t' and the second section $S_2$ is offset from the beginning $t_b$ by $t'+t_o$, wherein $t_o$ is a half of the pulse time spacing $\Delta t_1$, i.e. half of the inverse of the low pulse rate $PR_l$. Hence, the first section $S_1$ is offset with respect to the second section $S_2$ by $\Delta t_1/2$, when the first and second scans of the scan pattern 5 are put on top of each other as done in FIG. 5*b*.

Within the first scan of the scan pattern 5 during the first time interval $T_1$' only the pixels $P_i$ of the first section $S_1$ are required in the buffer 16 for modulating the pulse train 13, and within the second scan of the scan pattern 5 during the second time interval $T_2$' only the pixels $P_i$ of the second section $S_2$ are required in the buffer 16 for modulating the pulse train 13. The processor 21 may thus transfer in (at least) one segment 24 per scan (run) of the scan pattern 5 only those pixels $P_i$ that are actuals required in the near future. For instance, the processor 21 may transfer the pixels $P_i$ of the next scan of the scan pattern 5 at the end of each current scan of the scan pattern 5.

Instead of a "two-fold" interlacing of two sections $S_1$, $S_2$ as shown in FIGS. 5*a*-5*c* an "m-fold" interlacing of more than two, e.g., three, four, five, etc. sections $S_1, S_2, \ldots, Sm$ may be employed by mutually offsetting these m sections $S_1, S_2, \ldots, Sm$ with respect to the beginning $t_b$ of each scan of the scan pattern 5 by a positive or negative integer multiple n (n=1, 2, 3, . . . ) of an m-th (m=2, 3, 4, . . . ) of the inverse of the low pulse rate $PR_l$ when the low pulse rate $PR_l$ is an m-th of the inverse of the duration of stay $T_s$ in one pixel $P_i$. "n modulo m" should be unequal to zero ($n \bmod m \neq 0$) to prevent an overlapping of the pulses $\mathbf{18}_j$ of different sections.

Optionally, in an embodiment with an m-fold interlacing, the processor 21 may transfer (at least) one segment 24 per scan of the scan pattern 5 such that the buffer 16 only needs to store the pixels $P_i$ of the current (optionally: the current and one or more subsequent) scans of the scan pattern 5.

FIG. 6 illustrates a determination of the sequence 23 of pixels $P_i$ used for the two-fold interlacing of FIGS. 5*a*-5*c* as performed by the processor 21. A pre-calculated look-up table 28 holds indices i of the pixels $P_i$ to be successively displayed according to the scan pattern 5. The index i of a pixel $P_i$ indicates the position of that pixel $P_i$ within the image 2, and via that position its memory address in the memory 22. Each index i may, for instance, be an integer, e.g., i=14 indicating that pixel $P_{14}$ is the $14^{th}$ in the image 2, or a composite index such as, e.g., i=(2,3) indicating that pixel $P_{2,3}$ is in the $2^{nd}$ row and $3^{rd}$ column of the image 2, or a (hexadecimal) memory address i=(0x123456) indicating that pixel $P_{0x123456}$ is held at the memory address 0x123456, etc.

The look-up table 28 reproduces the Lissajous pattern 5 running over the image 2 and holds, for each of the pixels $P_i$ as they are subsequently passed (scanned) by the scan pattern 5, the corresponding pixel index i, here: the indices of the pixels $P_i$ of the first section $S_1$ or first succession in a first sub-table $\mathbf{28}_1$ and the indices of the pixels $P_i$ of the second section $S_2$ or second succession in a second sub-table $\mathbf{28}_2$. Hence, the processor 21 can determine the sequence 23 of pixels $P_i$ by retrieving, pixel-for-pixel, the pixels $P_i$ from the memory addresses indicated by the indices i of the look-up table 28.

In the example of FIG. 6 the processor 21 looks-up the first index i=6 in the look-up table $\mathbf{28}_1$, which is the index i of pixel $P_6$ to be played out at the beginning position $POS_b$ within the Lissajous pattern 5, then retrieves pixel $P_6$ from the memory address corresponding to the pixel index i=6 (see arrow 29) and puts it as first pixel into the sequence 23 (arrow 30). Then the processor 21 looks-up the second pixel index i=1 in the look-up table $\mathbf{28}_1$, which is the index i of pixel $P_1$ to be played out next within the Lissajous pattern 5, retrieves pixel $P_1$ from the memory address corresponding to the pixel index i=1 and appends it as second pixel $P_1$ to the sequence 23, and so on and so forth to determine the sequence 23. In this way, the processor 21 samples by means of the look-up table 28 the image 2 according to the Lissajous pattern 5 to determine the sequence 23. By splitting the look-up-table 28 in one sub-table $\mathbf{28}_1$, $\mathbf{28}_2$ per section $S_1$, $S_2$ or pixel succession, the processor 21 needs to access only one short look-up-table $\mathbf{28}_1$, $\mathbf{28}_2$ per scan of the scan pattern 5. Alternatively, one long look-up table 28 may be used for several scans.

FIG. 7 shows a method 31 for displaying the pixels $P_i$ of the image 2. The method 31 may be carried out by the display apparatus 1 as described above and comprises at least the following steps 32-39.

In a first step 32 the pulse generator 15 receives the brightness signal B, e.g. from a user input or the brightness sensor 20.

In a second step 33 the pulse generator 15 generates the pulse train 13 with the low pulse rate $PR_l$ when the brightness signal B indicates a low brightness or with the high pulse rate $PR_h$ when the brightness signal B indicates a high brightness.

In a third step 34 the pixels $P_i$ of the image 2 are stored in the buffer 16.

In a fourth step 35 the controller 12 successively receives the pixels $P_i$ stored in the buffer 16, e.g. by retrieving the pixels $P_i$ itself or by being fed by a buffer controller of the buffer 16.

As shown in FIG. 7, the steps 32, 33 and 34, 35 may be carried out in any order, as long as each pixel $P_i$ is received in the controller 12 when the respective pulse $\mathbf{14}_j$ of the generated pulse train 13 is received by the controller 12.

In a fifth step 36 the controller 12 modulates the pulse train 13 in pulse amplitude and/or pulse width according to the received pixels $P_i$.

In a sixth step 37 the controller 12 drives the light source 6 according to the modulated pulse train 17 to emit the light beam 4.

Concurrently, in step 38 the mirror driver 9 drives the mirror assembly 7 to oscillate according to the scan pattern 5, so that the mirror assembly 7 scans the light beam 4 over the image area 3 according to the scan pattern 5 (step 39).

Optionally, step 32 may be repeated to receive at least one further brightness signal B and, in case the brightness signal B indicates a different brightness, to generate the pulse train 13 with a different pulse rate PR in step 33.

The disclosed subject matter is not restricted to the specific embodiments described above but encompasses all variants, modifications and combinations thereof that fall within the scope of the appended claims.

What is claimed is:

1. A display apparatus, comprising a light source configured to emit a light beam;

a pulse generator configured to generate a pulse train having a pulse rate;

a buffer configured to store pixels of an image;

a controller configured to receive the pulse train and the stored pixels, to modulate the pulse train in pulse amplitude or in pulse width or in both pulse amplitude and pulse width according to the pixels, and to drive the light source according to the modulated pulse train;

a mirror assembly with one or more mirrors configured to oscillate and scan the light beam over an image area according to a scan pattern; and a mirror driver configured to drive the mirror assembly according to said scan pattern;

wherein the pulse generator is configured to receive a brightness signal and to generate the pulse train with a low pulse rate when the brightness signal indicates a low brightness and with a high pulse rate when the brightness signal indicates a high brightness.

2. The display apparatus according to claim 1, wherein the scan pattern is a Lissajous pattern.

3. The display apparatus according to claim 1, wherein the controller or the buffer is configured to receive a current position of the mirror assembly within the scan pattern from the mirror driver and to retrieve that stored pixel that corresponds to the current position from the buffer for modulating.

4. The display apparatus according to claim 1, further comprising a processor configured to hold the image in a memory, to determine a sequence of pixels of the image to be successively displayed according to said scan pattern, and to transfer said sequence of pixels in one or more successive segments to the buffer for storing.

5. The display apparatus according to claim 4, wherein the transferring of said segment/s is triggered by each m-th pulse of the pulse train, m being a positive integer.

6. The display apparatus according to claim 4, wherein the processor is configured to determine the sequence of pixels in successive parts.

7. The display apparatus according to claim 4, wherein the processor is configured to store a look-up table of indices of the pixels to be successively displayed according to said scan pattern and to determine the sequence of pixels by retrieving the pixels according to the look-up table from the memory.

8. The display apparatus according to claim 1, wherein the high pulse rate is at least twice of an inverse of a shortest duration of stay of the light beam in one pixel of said image when scanning the light beam according to the scan pattern.

9. The display apparatus according to claim 1, wherein the low pulse rate is less than an inverse of a shortest duration of stay of the light beam in one pixel of said image when scanning the light beam according to the scan pattern.

10. The display apparatus according to claim 9, wherein the low pulse rate is an m-th of the inverse of the duration of stay of the light beam in one pixel of said image when scanning the light beam according to the scan pattern, and wherein m successive sections of the pulse train each containing pulses of a respective scan of the scan pattern are mutually offset in time with respect to a beginning of the respective scan of the scan pattern by an integer multiple n of an m-th of the inverse of the low pulse rate, n modulo m being unequal to zero.

11. The display apparatus according to claim 9, further comprising a processor configured to hold the image in a memory, to determine a sequence of pixels of the image to be successively displayed according to said scan pattern, and to transfer said sequence of pixels in one or more successive segments to the buffer for storing, wherein the processor is configured to transfer at least one segment per scan of the scan pattern.

12. The display apparatus according to claim 1, wherein each pixel has two or more colours, wherein the light source comprises for each of said colours a sub-light source configured to emit a respective sub-light beam of the respective colour, and wherein the controller is configured to perform said modulating and driving separately for each of said colours.

13. A method for displaying pixels of an image, comprising by means of a pulse generator, receiving a brightness signal and generating a pulse train with a low pulse rate when the brightness signal indicates a low brightness and with a high pulse rate when the brightness signal indicates a high brightness;

storing said pixels in a buffer;

receiving the stored pixels successively in a controller;

by means of the controller, modulating the pulse train in pulse amplitude or in pulse width or in both pulse amplitude and pulse width according to the received pixels and driving a light source according to the modulated pulse train to emit a light beam;

driving, by means of a mirror driver, a mirror assembly with one or more mirrors to oscillate according to a scan pattern; and scanning, by means of the mirror assembly, the light beam over an image area according to said scan pattern.

14. The method according to claim 13, wherein the high pulse rate is at least twice of an inverse of a shortest duration of stay of the light beam in one pixel of said image when scanning the light beam according to the scan pattern.

15. The method according to claim 13, wherein the low pulse rate is less than an inverse of a shortest duration of stay of the light beam in one pixel of said image when scanning the light beam according to the scan pattern.

16. The display apparatus according to claim 6, wherein each part comprises at least one segment.

17. The display apparatus according to claim 12, wherein the colours that each pixel has are red, green and blue.

* * * * *